(12) United States Patent
Sasson et al.

(10) Patent No.: US 6,798,785 B1
(45) Date of Patent: Sep. 28, 2004

(54) FRAME RELAY OVER IP

(75) Inventors: Israel Sasson, Petah Tikya (IL); Gonen Zilber, Petah-Tikva (IL); Gil Biran, Raananna (IL)

(73) Assignee: Axerra Networks, Ltd., Tel Aviv (IL)

( * ) Notice: Subject to any disclaimer, the term of this patent is extended or adjusted under 35 U.S.C. 154(b) by 0 days.

(21) Appl. No.: 09/499,214

(22) Filed: Feb. 7, 2000

(51) Int. Cl.[7] .................................................. H04J 3/16
(52) U.S. Cl. ...................... 370/466; 370/474; 370/401
(58) Field of Search ............................... 370/389, 392, 370/400, 401, 465, 466, 471, 901, 474

(56) References Cited

U.S. PATENT DOCUMENTS

| | | |
|---|---|---|
| 5,742,668 A | 4/1998 | Pepe et al. |
| 5,850,391 A | 12/1998 | Essigmann |
| 5,901,352 A | 5/1999 | St-Pierre et al. |
| 5,949,773 A | 9/1999 | Bhalla et al. |
| 6,426,944 B1 * | 7/2002 | Moore ........................ 370/236 |

* cited by examiner

*Primary Examiner*—Douglas Olms
*Assistant Examiner*—Robert W. Wilson
(74) *Attorney, Agent, or Firm*—Katten Muchin Zavis Rosenman

(57) ABSTRACT

A system and method of implementing interworking function (IWF) between frame relay and IP protocols and networks. The interworking function provides mapping and encapsulation functions necessary to ensure service provided to networks/protocols is unchanged. A frame relay service specific convergence sublayer (FR-SSCS) translates between the Q.922 and UDP/IP sublayer.

20 Claims, 11 Drawing Sheets

FRAME RELAY OVER IP

BACKGROUND OF THE INVENTION

1. Field of Invention

The present invention relates generally to the field of communication protocols. More specifically, the present invention is related to transferring a frame relay protocol over an Internet protocol.

2. Discussion of Prior Art

One of the most popular packet-switching protocols for connecting devices on a Wide Area Network (WAN) is the Frame Relay. Frame Relay networks in the U.S. typically support data transfer rates at T-1 (1.544 Mbps) and T-3 (45 Mbps) speeds. In fact, you can think of Frame Relay as a way of utilizing existing T-1 and T-3 lines owned by a service provider. Most telephone companies now provide Frame Relay service for customers who want connections at 56 Kbps to T-1 speeds. (In Europe, Frame Relay speeds vary from 64 Kbps to 2 Mbps.)

Frame Relay, a popular Legacy protocol, is capable of supporting large bit rates and, in the U.S. is quite popular because it is relatively inexpensive. Unlike older protocols, i.e. before the 1990's, the Frame Relay minimizes error correction, editing and retransmission features, sparse data management operations (e.g. traffic acknowledgment), etc. Because todays' communication systems are built using high quality communication networks (low bite error rates—BERs) which often perform much of the overhead associated with completion of transmissions, the need for extensive embedded features no longer exists. The Frame Relay, absent one or more layers, enables a faster less cluttered transmission protocol.

The present communications revolution has been focused on the Internet and World Wide Web (WWW) with emphasis on the Internet protocol (IP). Frame relay uses variable length protocol data units (PDUs). However, Frame Relay does not work well with variable delay units as typically found in Internet carried digital voice and video. The prior art has failed to teach a viable solution to handling Frame Relay (FR) over Internet Protocol (IP).

Each of the below described references teach methods of interworking functioning (IWF) for differing protocols across various communication standards. However, none of the references provide or suggest the present invention method of Frame Relay over IP.

The patent to Essigmann (U.S. Pat. No. 5,850,391), assigned to Telefonaktiebolaget L M Ericsson, provides for a Shared Interworking Function Within a Mobile Telecommunications Network. Essigmann discloses a method and apparatus for communicating interworking function (IWF) control data between a mobile switching center (MSC) and a telecommunication node as illustrated in FIG. 5 (U.S. Pat. No. 5,850,391). The serving MSC encapsulates the identified IWF control data into an optional parameter within an integrated service digital network user part (ISUP) signal. The MSC then transmits the ISUP signal encapsulating the IWF control data towards the telecommunications node.

The patent to St-Pierre et al. (U.S. Pat. No. 5,901,352) provides for a System for Controlling Multiple Networks and Associated Services. This reference describes a system for enabling network convergence and interworking between multiple communication networks. FIG. 1 (U.S. Pat. No. 5,901,352) illustrates telecommunication network (10) with mobile switching center (30) that includes interworking function (IWF) for providing communication over different protocols.

The patent to Bhalla et al. (U.S. Pat. No. 5,949,773), assigned to Motorola, Inc., provides for a Method for Transferring a Data Signal in a Wireless Communications System. Disclosed is a system for transferring a data signal in a communication system. Source selection distribution unit (SDU) (248) in FIG. 3 (U.S. Pat. No. 5,949,773) converts incoming data signal (107) to frame relay switched virtual circuit (FR SVC) protocol suitable for conversion by source interworking function (IWF) (214), thus eliminating the need for protocol conversion by source SDU (170).

The non-patent literature entitled, "Trends for 1999: Interworking Between Frame Relay and IP networks", Network World Fusion, Jan. 1, 1999 (www.nwfusion.com) provides a brief look at IP traffic bound for a destination on a Frame Relay network which gets concentrated to one or more sites. At these sites, routers (or a routing function) also know the IP addresses at the ends of the frame relay PVC's.

The patent to Pepe et al. (U.S. Pat. No. 5,742,668), assigned to Bell Communications Research, Inc. provides for a personal internetwork over wireless or wire-line communication mediums.

Whatever the precise merits, features and advantages of the above cited references, none of them achieve or fulfills the purposes of the present invention. These and other objects are achieved by the detailed description that follows.

SUMMARY OF THE INVENTION

A system and method of implementing interworking function (IWF) between frame relay and IP protocols and networks. The interworking function provides mapping and encapsulation functions necessary to ensure that service (protocols) provided to networks is kept unchanged. The present invention provides a Frame Relay service specific convergence sublayer (FR-SSCS) necessary to translate between the Q.922 and UDP/IP sublayer.

DESCRIPTION OF THE PREFERRED EMBODIMENTS

Figure 1:
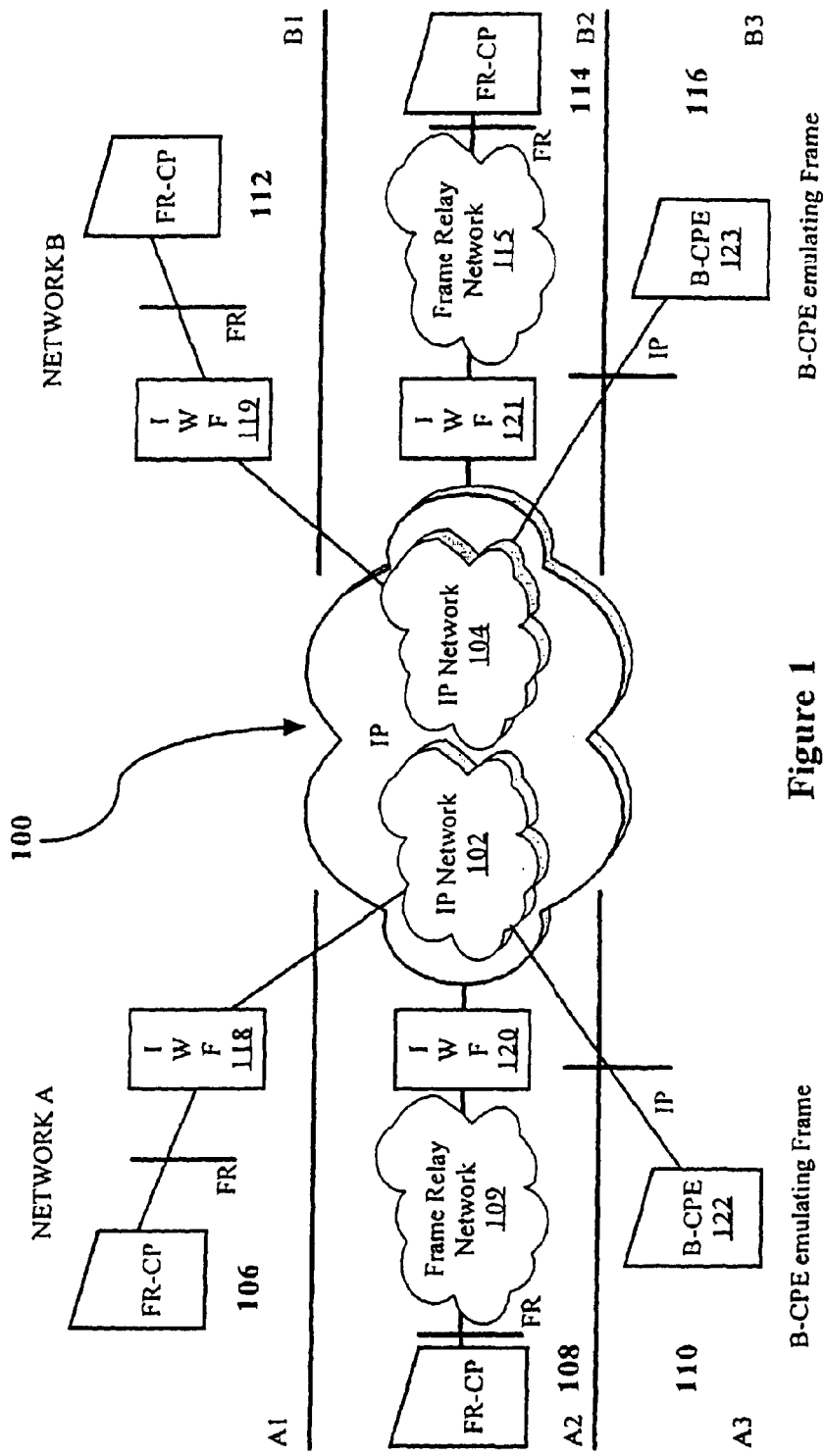
FIG. 1 illustrates FRS support on an IP-based Multi-Service Interface.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates FRS support on an IP-based Multi-Service Interface. An IP network 100, comprising one or more IP Networks 102 and 104, according to the present invention, supports variously configured connections to Frame Relay networks FR-CP "A1–A3" and "B1–B3" (106, 108, 110 and 112, 114, 116, respectively). A1 and B1 illustrate Frame Relay processing connection through interworking functions 118 and 119, respectively. A2 and B2 illustrate a Frame Relay processing connection carried across Frame Relay Networks 109 and 115 through interworking functions 120 and 121, respectively. Configurations A3 and B3 illustrate CPEs that also support FR encapsulation. These CPEs can support Protocol mapping, but from the IWF view, it doesn't make any difference whether they are sent to B1, B2, or B3.

The interconnections A1–A3 and B1–B3 lead to 6 possible reference configurations. A complete list of reference configurations is:

| 1 | A1 to B1 |
|---|----------|
| 2 | A1 to B2 |
| 3 | A1 to B3 |
| 4 | A2 to B2 |
| 5 | A2 to B3 |
| 6 | A3 to B3 |

Figure 2:
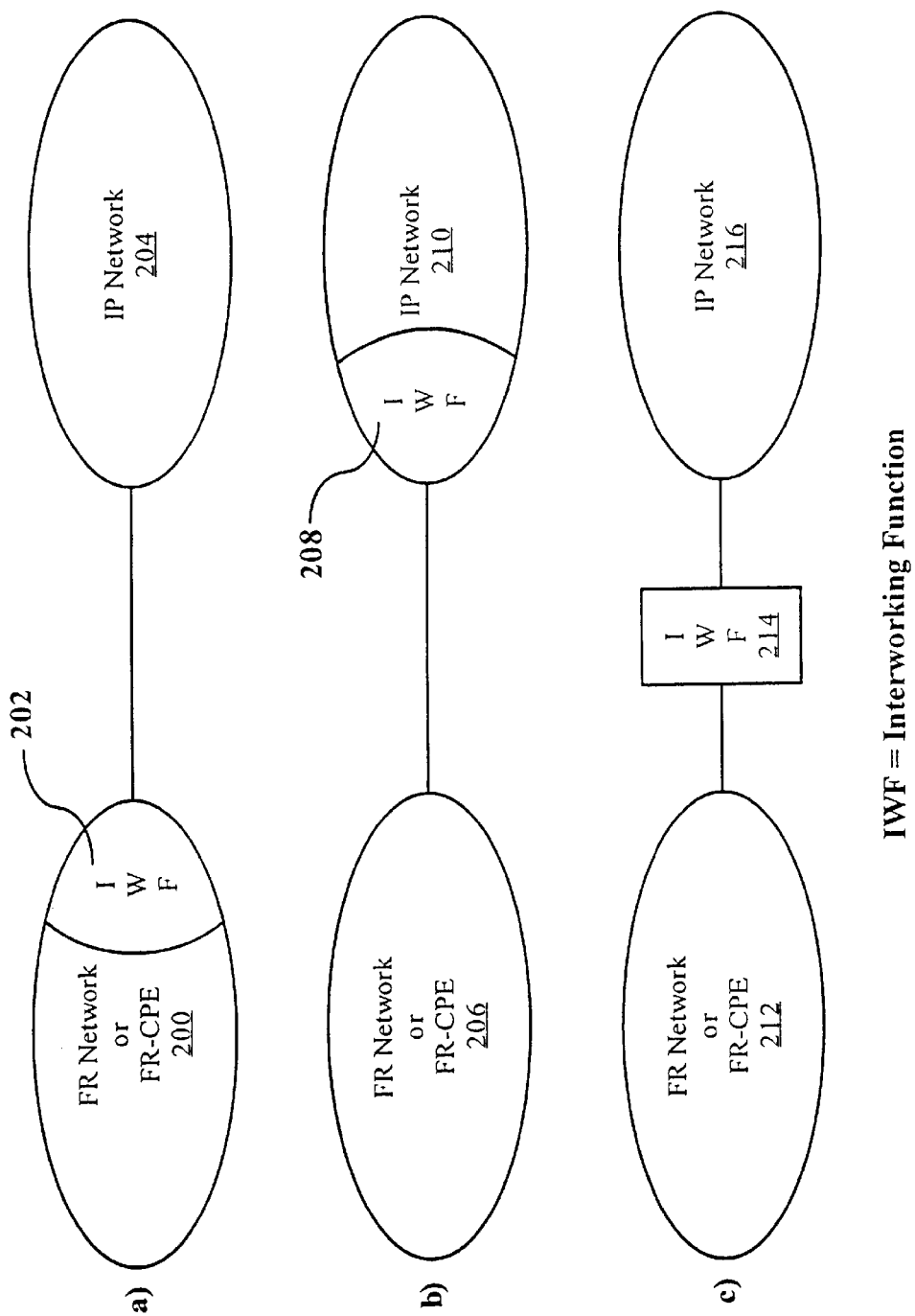
FIG. 2 illustrates equivalent realizations of IWF.

FIG. 1 does not imply any particular physical location for an IWF. FIG. 2 illustrates equivalent realizations of IWF. As shown, configuration "a" comprises placing the IWF 202 at the FR source 200 before connection with the destination IP network 204. Configuration "b" comprises placing the IWF 208 at access to the destination IP network and configuration "c" comprises placing the IWF 214 in-between the FR source 212 and the destination IP network 216.

Figure 3:
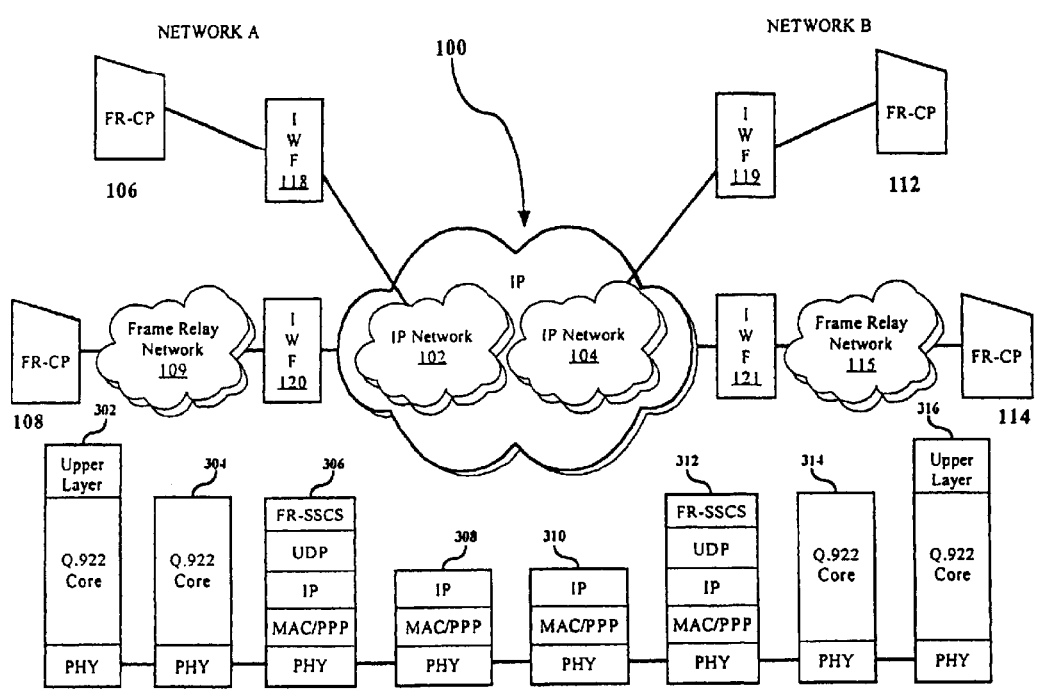
FIG. 3 illustrates Network Interworking.

FIG. 3 illustrates an overview of the present invention Network Interworking. Specifically, elements 302 through 316 illustrate the OSI models, including sub-layers, for each of the frames of elements 102 through 121. FR-CP 108 includes sub-layers Upper Layer, Q.922 Core, and PHY 302. Frame Relay Network 109 includes sub-layers Q.922 Core and PHY 304. IWF 120 map Q.922 into sub-layers FR-SSCS, UDP, IP, MAC/PPP, and PHY 306. IP Network 102 includes sub-layers IP, MAC/PPP, and PHY 308. Elements 104, 114, 115, and 121 reflect identical structures.

Figure 4:
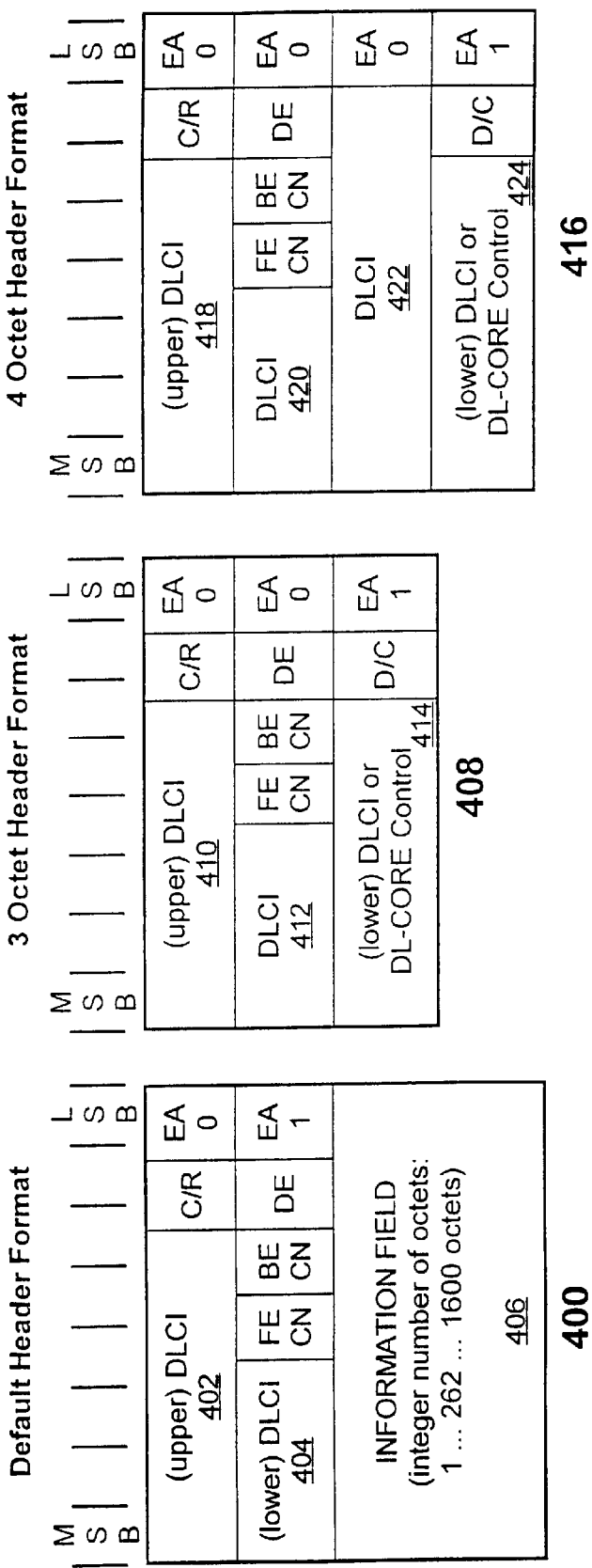
FIG. 4 illustrates the structure of the FR-CS-PDU.

FIG. 4 illustrates the structure of the FR-CS-PDU. As shown, the "default header format" 400 comprises an upper DLCI field 402, lower DLCI 404, and sub-layers information field 406. The "3 octet header format" 408 comprises an upper DLCI field 410, DLCI sub-layer 412, and lower DLCI or DL-core control sublayer 414. The "4 octet header format" 416 comprises an upper DLCI field 418, DLCI sublayer 420, a second DLCI sublayer 422 and lower DLCI or DL-core control 424 sublayer.

DETAILED DESCRIPTION OF PREFERRED EMBODIMENTS

There are two scenarios for handling FR; Network Interworking—Sending the FR frame, as is, through the IP network to another FR device and Service Interworking—Taking out the IP from the FR frame (encapsulate by RFC-1490) and sending them to the IP network. The following descriptions will describe the Network Interworking scenario that is covered by this patent.

The open system interface OSI Model comprises a plurality of layers as shown below:

7 Application Layer
Program-to-program communication.
6 Presentation Layer
Manages data representation conversions. For example, the Presentation Layer would be responsible for converting from EBCDIC to ASCII.
5 Session Layer
Responsible for establishing and maintaining communications channels. In practice, this layer is often combined with the Transport Layer.
4 Transport Layer
Responsible for end-to-end integrity of data transmission.
3 Network Layer
Routes data from one node to another.
2 Data Link Layer
Responsible for physical passing data from one node to another.
1 Physical Layer
Manages putting data onto the network media and taking the data off.

Figure 5:
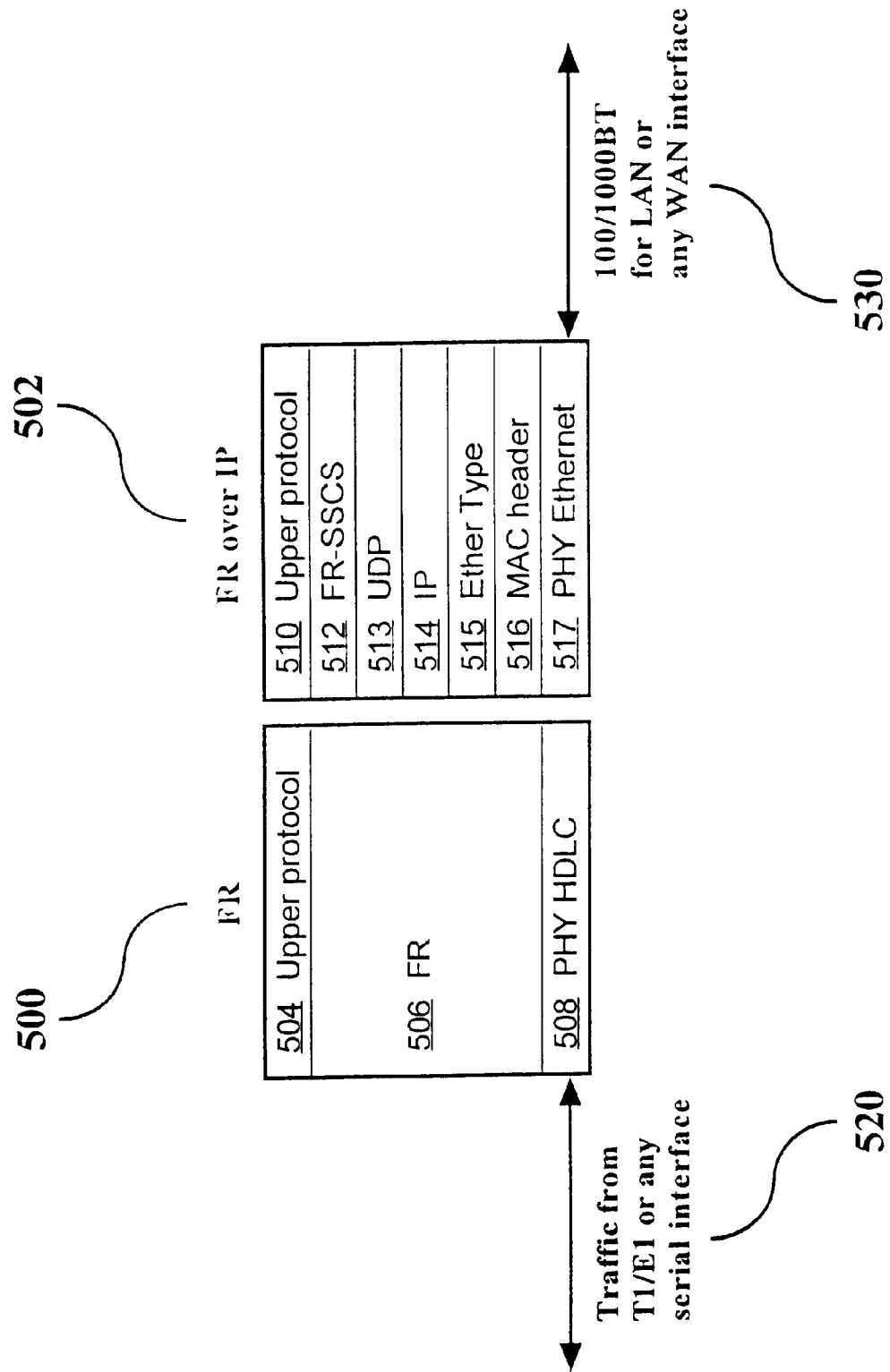
FIG. 5 illustrates the pseudo OSI layers of the Network Interworking.

FIG. 5 illustrates the pseudo OSI layers of the Network Interworking of the present invention. Traffic 520 from T1/E1 or any serial interface in the FR protocol comprises the layers: upper protocol 504 (IP, SNA or any higher layer protocol), the FR core layer 506 Q.922 and physical layer (PHY) with HDLC 508.

The HDLC PHY 508 describes the PHY which is the lowest layer in the OSI Reference Model. Every network interface card (NIC) has a DLC address or DLC identifier (DLCI) that uniquely identifies the node on the network. Some network protocols, such as Ethernet and Token-Ring use the DLC addresses exclusively. Other protocols, such as TCP/IP, use a logical address at the Network Layer to identify nodes. Ultimately, however, all network addresses must be translated to DLC addresses. In TCP/IP networks, this translation is performed with the Address Resolution Protocol (ARP). For networks that conform to the IEEE 802 standards (e.g., Ethernet), the DLC address is usually called the Media Access Control (MAC) address.

The Media Access Control address is a hardware address that uniquely identifies each node of a network. In IEEE 802 networks, the Data Link Control (DLC) layer of the OSI Reference Model is divided into two sublayers: the Logical Link Control (LLC) layer and the Media Access Control (MAC) layer. The MAC layer interfaces directly with the network media. Consequently, each different type of network media requires a different MAC layer. On networks that do not conform to the IEEE 802 standards but do conform to the OSI Reference Model, the node address is called the Data Link Control (DLC) address.

The FR over IP pseudo OSI layers 502 comprise an upper protocol 510, Frame Relay Service Specific Convergence Sublayer (FR-SSCS) 512 which is necessary to translate between the Q.922 and UDP/IP sublayers 513 and 514. The User Datagram Protocol (UDP) is a connectionless protocol that, like TCP, runs on top of IP networks. Unlike TCP/IP, UDP/IP provides very few error recovery services, offering instead a direct way to send and receive datagrams over an IP network.

Sub-layers 515, 516 and 517 provide the Ethernet type, MAC header and PHY Ethernet respectively.

Figure 6:
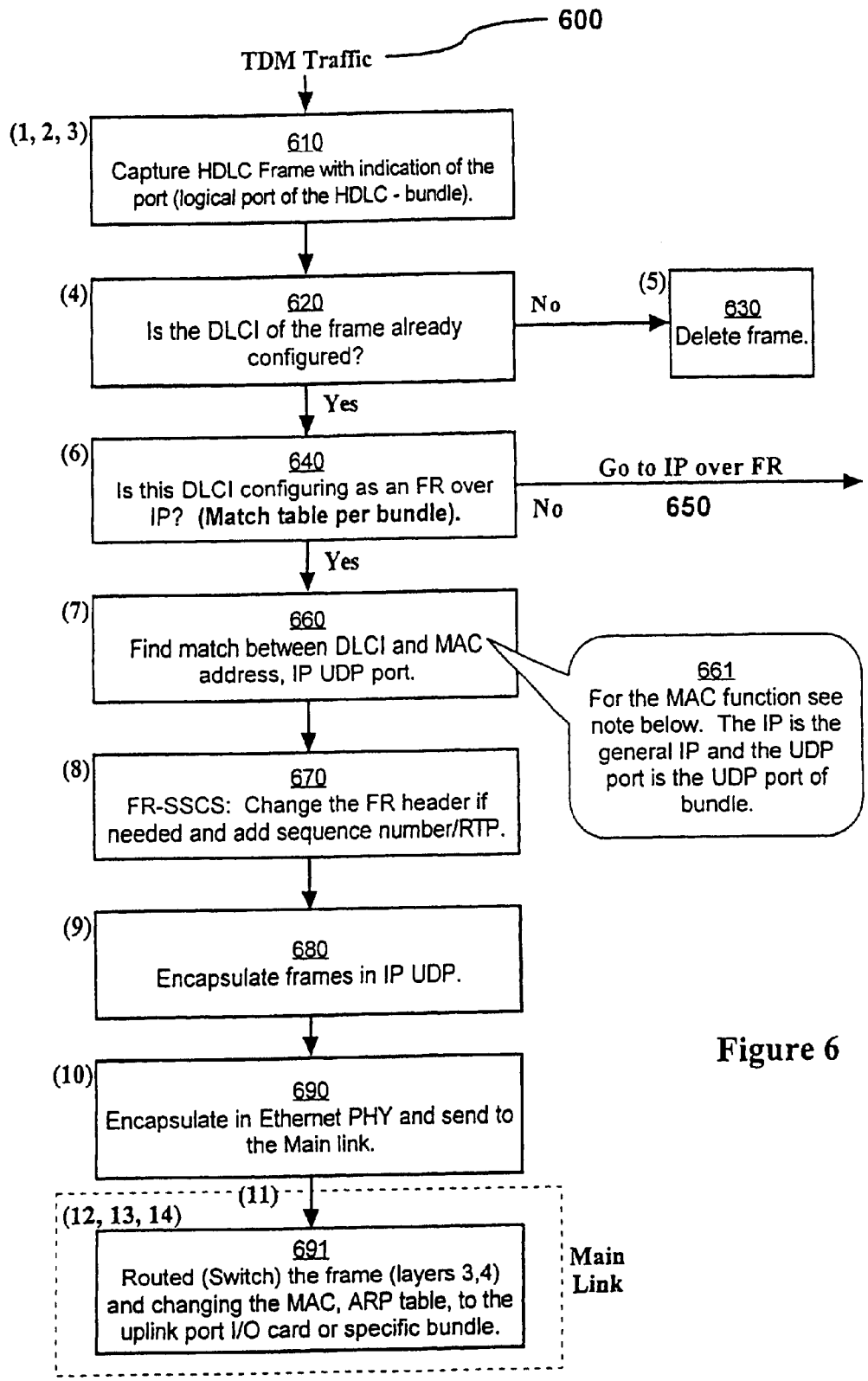
FIG. 6 illustrates a high level flow diagram of flow from the I/O ports.

FIG. 6 illustrates a high level flow diagram of the flow from the I/O ports to the uplink. From TDM traffic 600 a HDLC Frame is captured 610 with an indication of the port (logical port of the HDLC—bundle). In step 620, if the DLCI of the frame is not already configured, the frame is deleted 630; if the frame is configured, a determination is made if the DLCI is configured as an FR over IP 640. If not configured as a FR over IP, then the frame is sent to determine if it is IP over FR 650. If configured as FR over IP, a match is searched between DLCI and MAC addresses, IP UDP port 660. For the MAC function the IP is the general IP and the UDP port is the UDP port of the bundle 661. At step 670, a Frame Relay Service Specific Convergence Sublayer (FR-SSCS) is determined; changing the FR header if needed and adding the sequence number/RTP. The frames are then encapsulated in IP/UDP 680 and further in Ethernet PHY 690 and sent to the main link. At step 691, the frame layers 3,4 are routed and the MAC, ARP table changed to the uplink port I/O card or specific bundle.

Figure 7:
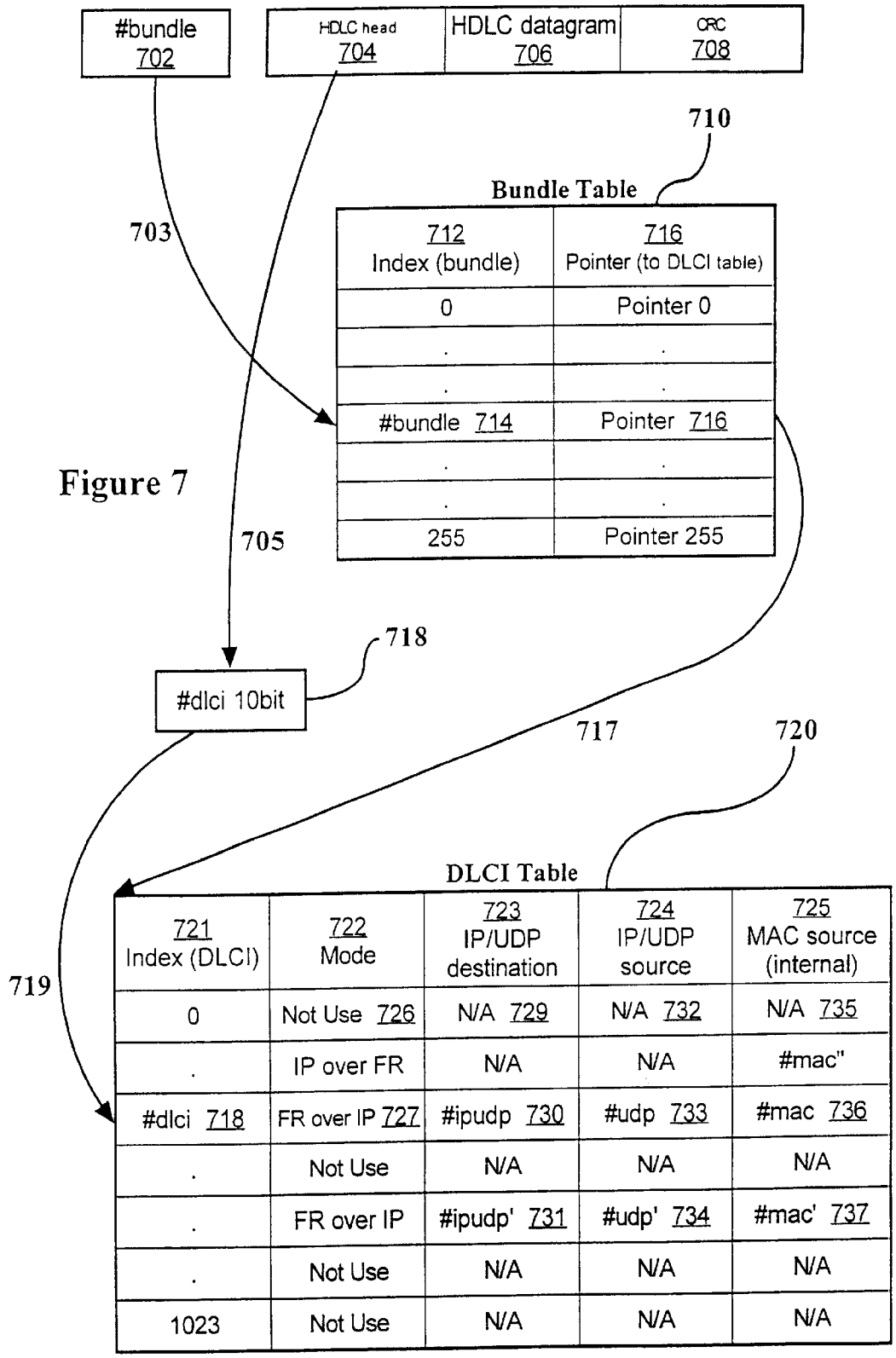
FIG. 7 illustrates flow from the I/O ports.

FIG. 7 illustrates a more detailed flow from the I/O ports toward the uplink. Step numbers below correlate to those shown in FIG. 6 (left-hand side of flow elements). From the IO ports:

(1) Receive HDLC frame 704 (including HDLC datagram 706 and check bit(s) CRC 708) on bundle number #bundle 702

(2) Find by look-up table 710 pointer 716 to the DLCI table of the bundle #bundle 714 (bundle selected by flow 703). Each bundle has its own DLCI table 720. Each bundle table comprises an index 712 of bundles and a pointer 716 to a DLCI table 720 by flow 717. DLCI table 720 comprises an index DLCI 721, Mode 722, IP UDP destination 723, IP UDP source 724, and MAC source (internal) 725.

(3) Calculate 705 the DLCI from the HDLC header 704. DLCI number #dlci 718 (flow 719 to DLCI table 720).

(4) Find by look-up table (DCLI 720) if this DLCI configures to IP over FR (not shown), FR over IP 727 or is not used 726. This mode determines how to handle this DLCI.

(5) If this DLCI mode is not used 726, delete the frame and don't continue.

(6) If the mode is FR over IP 727:

(7) Find by look up table (can be the same DLCI table) the destination IP and UDP port 723 and the source UDP port 724 and MAC source (internal) 725.

Figure 8:
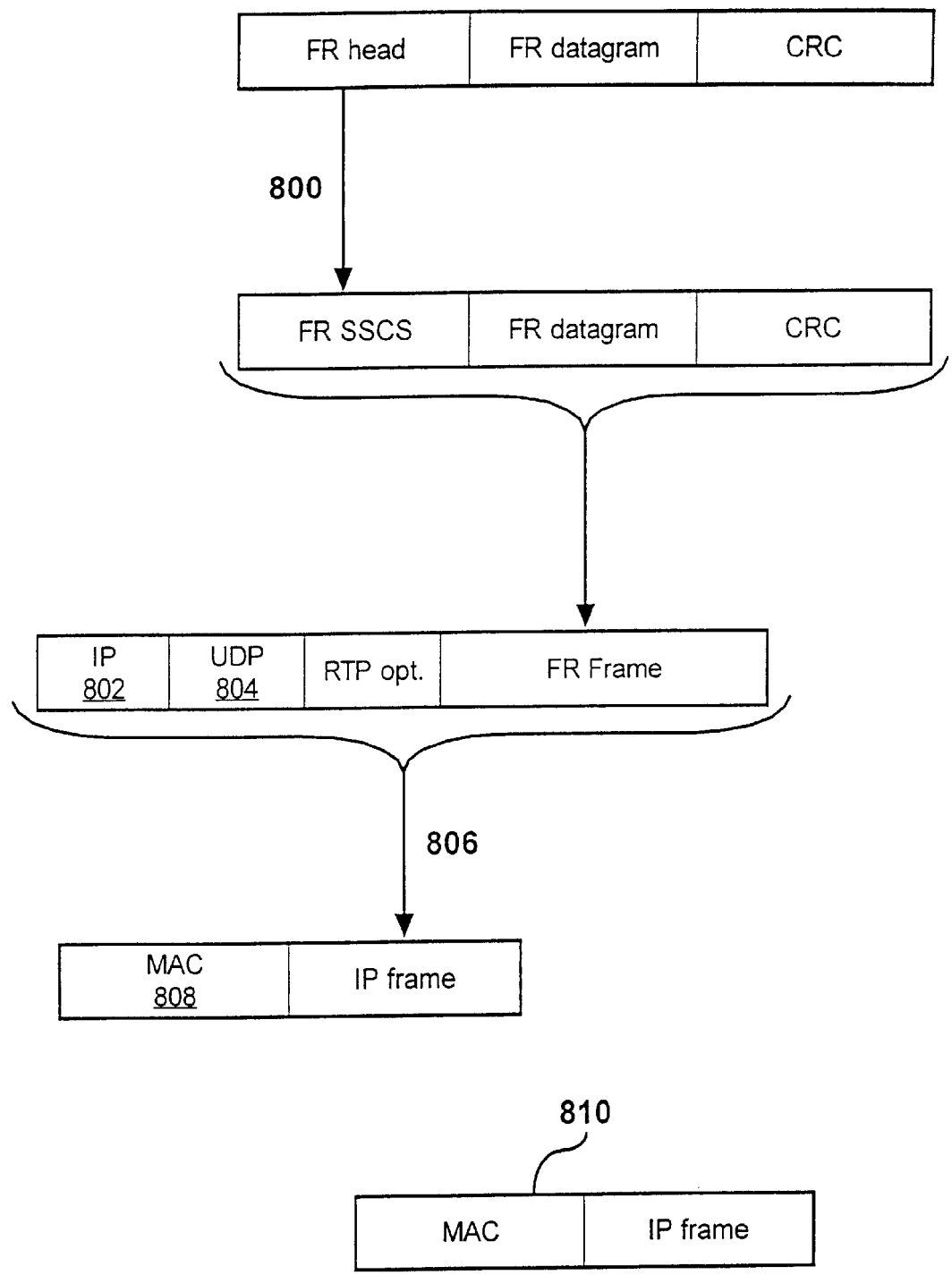
FIG. 8 illustrates the continued flow from FIG. 7 if the mode is FR over IP.

FIG. 8 illustrates the continued flow from FIG. 7.

(8) Change the FR header if needed (optional FR-SSCS) 800.

(9) Encapsulate the frame in IP UDP 802/804 selected from the DLCI table 720.

(10) Encapsulate 806 the frame in MAC layer 808. The destination MAC is the internal MAC of the uplink, the source MAC internal address of the DLCI 725.

(11) Send the frame to the uplink 810.

(12) Route the Frame (layer 3,4) to the right direction, usually to the uplink.

(13) Change the destination MAC to the MAC of the GSR (Gigabit Switch Router) and source MAC to the external MAC of the uplink.

(14) Send the frame out through the uplink port.

Figure 9:
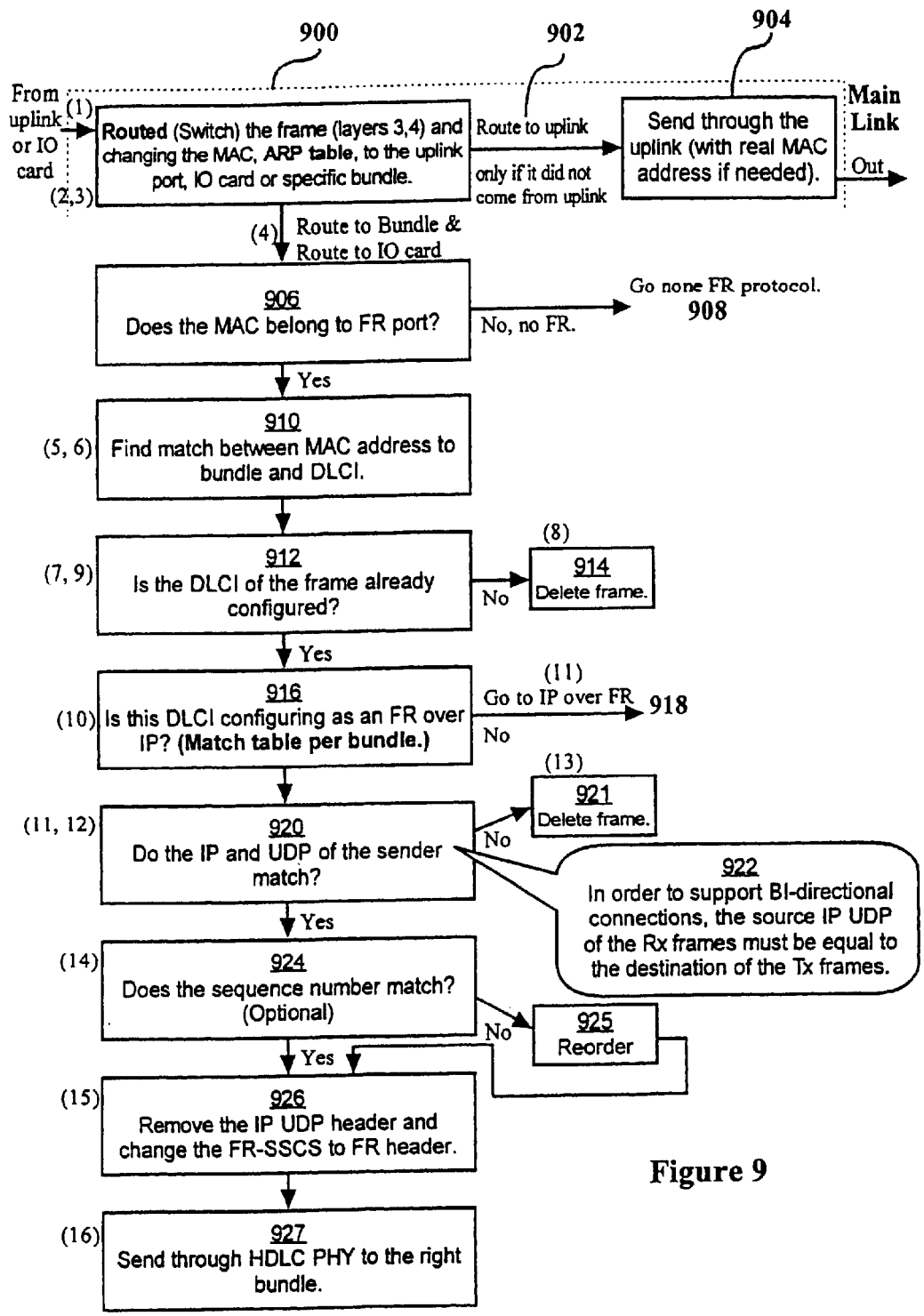
FIG. 9 illustrates a high level flow diagram of flow from the uplink.

FIG. 9 illustrates a high level flow diagram of flow from the uplink to I/O.

Main link 900 includes routing of the frame (layers 3,4) and changing the MAC, ARP table, to the uplink port, I/O card or specific bundle. If the frame did not come from the uplink, then it can be sent through the uplink (with real MAC address if needed). Otherwise it is routed to the bundle and I/O card. At step 906, if the MAC belongs to FR port, the protocol is FR 908. If yes, then a match is determined between the MAC address to bundle and DLCI 910. If the DLCI is not already configured, it is deleted 914. If it is configured, then a determination is made to determine FR over IP 916 (match table per bundle). If it is determined not to be FR over IP, a determination is made as to wether it is IP over FR 918. If it is determined to be FR over IP, a comparison of the IP and UDP of the sender is made 920 (in order to support bidirectional connections, the source IP UDP of the Rx frames must be equal to the destination of the Tx frames). If they do not match, the frame is deleted 921. A positive comparison yields a progression to check wether the sequence number (RTP) matches 924. If not, reorder of frames is done 925. If it matches, the IP/UDP header is removed and the FR-SCCS is changed to the FR header 926. The HDLC PHY is then sent to the right bundle 927.

Figure 10:
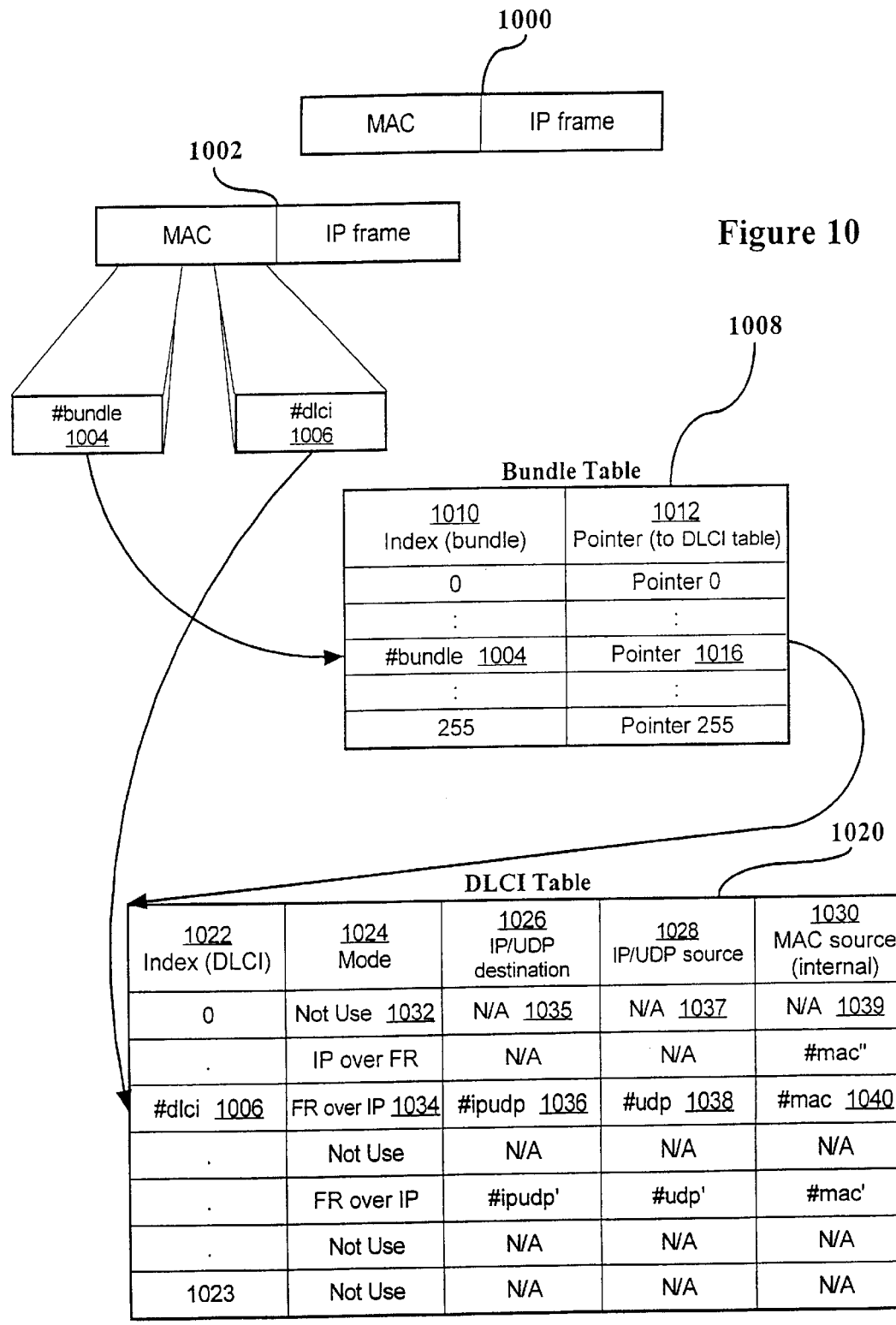
FIG. 10 illustrates flow from the uplink.

FIG. 10 illustrates a detailed flow from the uplink toward the I/O ports (Step numbers below correlate to those shown in FIG. 9 (left-hand side of flow elements):

(1) Receive frame from the uplink port 1000.

(2) Route the Frame (layer 3,4) to the right direction.

(3) Change the destination MAC 1002 to the MAC of DLCI and source MAC to the internal address of the uplink.

(4) Send the frame to the I/O card.

(5) Find the bundle number (#bundle) 1004 and the DLCI number (#dlci) 1006 from the MAC.

(6) Find by look-up table 1008 pointer 1016 to the DLCI table 1020 of the bundle #bundle 1004. Each bundle has its own table. The table 1008 comprises an index (bundle) 1010 and related pointer 1012.

(7) Find by look-up table 1020, determine if this DLCI configures as FR over IP. DLCI table 1020 comprises index 1022, mode 1024, IP UDP destination 1026, IP UDP source 1028, and MAC source (internal) 1030.

(8) If this DLCI is not used 1032, delete the frame.

(9) Remove the MAC layer from the frame. The mode determines how to handle this frame.

(10) If the mode is FR over IP 1034:

(11) The IP data gram contains UDP, RTP is optional and FR frame. Find by look up table (can be the same DLCI table 1020) the destination IP and UDP port 1036.

(12) Compare them with the IP UDP of the source of that frame 1038.

(13) If they are not equal delete the frame. If they are equal:

(14) Check the sequence number of the RTP, optional.

Figure 11:
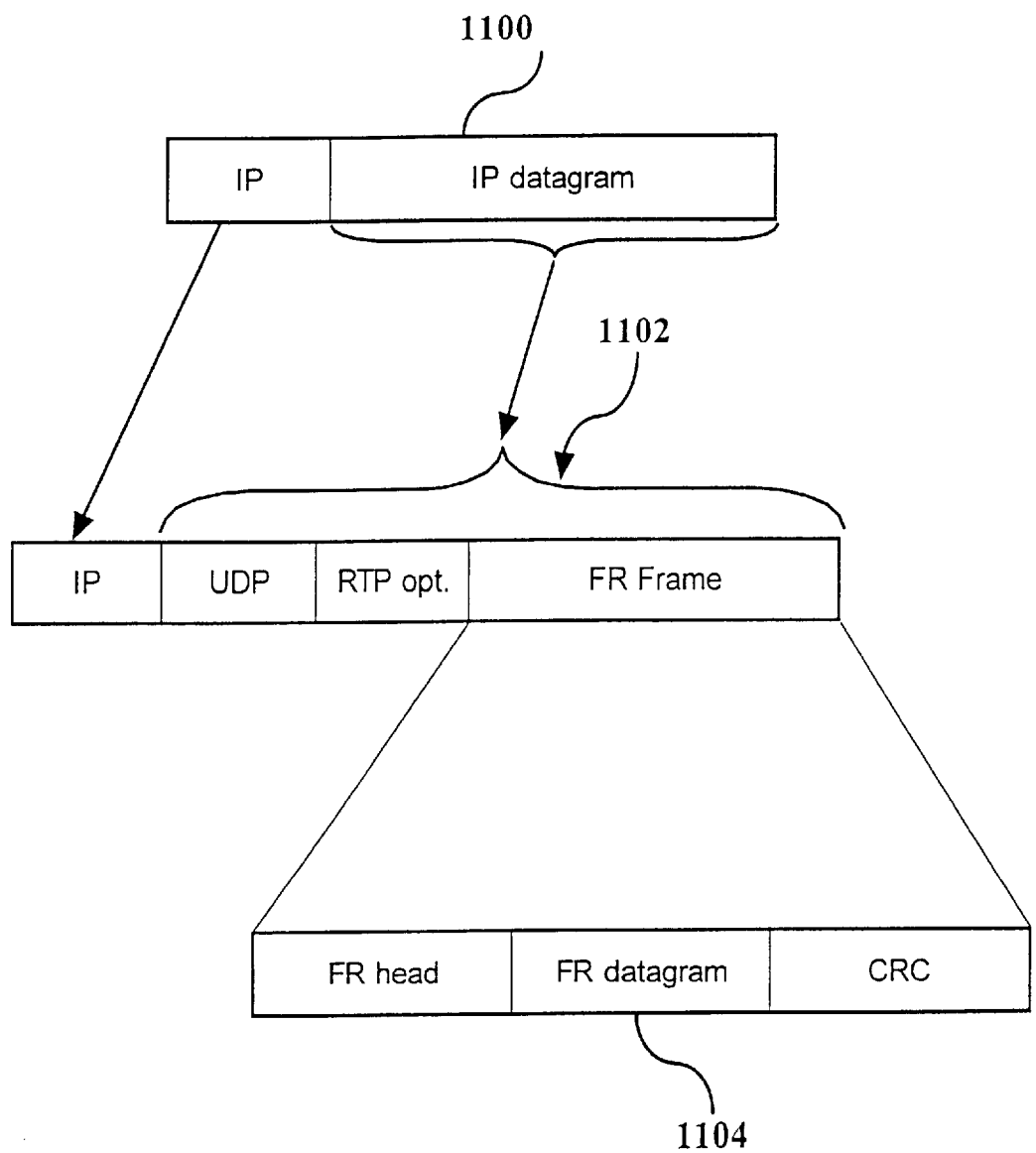
FIG. 11 illustrates the continued flow from FIG. 10 if the mode is FR over IP.

FIG. 11 illustrates the continued flow from FIG. 10 if the mode is FR over IP.

(15) Remove the IP UDP RTP 1102.

(16) Send the frame through bundle number #bundle 1104.

The FR-SSCS can support multiple connections multiplexing using the Data Link Connection Identifier (DLCI) field. In addition, the IP layer supports connection multiplexing using its IP/UDP port. There are two methods of multiplexing FR connections One-to-One and Many-to-One. Those methods can be implemented with IP network as flow:

1. One-to-One: Each FR logical connection is mapped to a single IP/UDP port. Multiplexing is performed at the IP/UDP port layers. The FR-SSCS DLCI value (in the range of 16–991) used for user plane traffic and should be agreed upon between the two IP end systems.
2. Many-to-One: Multiple FR logical connections are multiplexed into a single IP/UDP port. Multiplexing is accomplished at the FR-SSCS sublayer using DLCIs. The Many-to-One method may be used only for FR PVCs that terminate on the same IP-based end systems. The FR-SSCS DLCI value(s) used shall be agreed upon between the two IP end systems.

The above description of the method to enable FR over IP and its described functional elements are implemented in various computing environments. For example, the present invention may be implemented on a conventional IBM PC, Macintosh or equivalent, multi-nodal system (e.g. LAN) or networking system (e.g. Internet, WWW) with embedded CPU. All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of communications programming.

CONCLUSION

A system and method has been shown in the above embodiments for the effective implementation of a FR over IP. While a preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment or specific computing hardware. In addition, the specific sub-layer schemes are representative of the preferred embodiment and should not limit the scope of the invention.

What is claimed is:

1. A computer based communications system implementing Frame Relay over an Internet Protocol network (FR over IP, FRoIP), said system comprising:
   an IP network;
   one or more frames of one or more Frame Relay networks or any type of encapsulated protocols in a frame relay frame operatively connected to said IP network;
   interworking functions operatively connected to or between either of said IP network or Frame Relay networks,
   wherein said interworking functions include a conversion of said one or more frames to an IP compatible format suitable for transfer over said IP network, and
   wherein said conversion includes a Frame Relay Service specific convergence sub-layer to translate between a Frame Relay core and a UDP/IP sub-layer.

2. A computer based communications system implementing Frame Relay over an Internet Protocol network (FR over IP, FRoIP) as per claim 1, wherein said Frame Relay service specific convergence sub-layer uses a PDU format identical to a Q.922 core, with CRC-16 (also optional CRC-32), without flags and zero bit insertion.

3. A computer based communications system implementing Frame Relay over an Internet Protocol network (FR over IP, FRoIP) as per claim 1, wherein said Frame Relay service specific convergence sub-layer supports connection multiplexing using a Data Link Connection Identifier (DLCI).

4. A computer based communications system implementing Frame Relay over an Internet Protocol network (FR over IP, FRoIP) as per claim 3, wherein said IP layer supports said connection multiplexing using its IP/UDP port.

5. A computer based communications system implementing Frame Relay over an Internet Protocol network (FR over IP, FRoIP), said system comprising:
   an IP network;
   one or more frames of one or more Frame Relay networks or any type of encapsulated protocols in a frame relay frame operatively connected to said IP network;
   interworking functions operatively connected to or between either of said IP network or Frame Relay networks,
   wherein said interworking functions include a conversion of said one or more frames to an IP compatible format suitable for transfer over said IP network, and
   wherein said Frame Relay core comprises a Q.922 core.

6. A computer based communications system implementing Frame Relay over an Internet Protocol network (FR over IP, FRoIP), said system comprising:
   an IP network;
   one or more frames of one or more Frame Relay networks or any type of encapsulated protocols in a frame relay frame operatively connected to said IP network;
   interworking functions operatively connected to or between either of said IP network or Frame Relay networks,
   wherein said interworking functions include a conversion of said one or more frames to an IP compatible format suitable for transfer over said IP network, and
   wherein said converted FR includes multiple sub-layers comprising an upper protocol, FR-SSCS, UDP, IP, Ether type, MAC header, and PHY Ethernet.

7. A computer based communications system implementing Frame Relay over an Internet Protocol network (FR over IP, FRoIP), said system comprising:
   an IP network;
   one or more frames of one or more Frame Relay networks or any type of encapsulated protocols in a frame relay frame operatively connected to said IP network;
   interworking functions operatively connected to or between either of said IP network or Frame Relay networks,
   wherein said interworking functions include a conversion of said one or more frames to an IP compatible format suitable for transfer over said IP network, and
   wherein said conversion utilizes a bundle look-up table and a DLCI look-up table.

8. A computer based communications system implementing Frame Relay over an Internet Protocol network (FR over IP, FRoIP) as per claim 7, wherein said bundle look-up table comprises a bundle number index and corresponding DLCI pointer table indicator.

9. A computer based communications system implementing Frame Relay over an Internet Protocol network (FR over IP, FRoIP) as per claim 7, wherein said DLCI look-up table comprises a DLCI index, mode determination, IP/UDP destination, IP/UDP source, and MAC source.

10. A computer based communications system implementing Frame Relay over an Internet Protocol network (FR over IP, FRoIP) as per claim 9, wherein said mode determination includes at least "FR over IP", "IP over FR" or "not used" designations.

11. A system implementing, in a computer environment, FR over IP comprising:
- a communications system comprising I/O FR traffic frames, said I/O FR traffic frames comprising an HDLC frame of a first bundle number;
- a bundle look-up table, said table comprising a bundle index and related pointer to a DLCI look-up table of said first bundle number;
- a calculator, said calculator determining a DLCI from a header of said HDLC;
- said DCLI look-up table comprising at least a DLCI index and correlating mode determination, said mode including any of: IP over FR, FR over IP or not used;
- said DCLI look-up table further including any of: a destination IP/UDP port, source IP/UDP port and MAC source;
- FR header converter, said converter including FR-SSCS;
- first encapsulation element to encapsulate at least one I/O FR traffic frame in IP/UDP as selected from said DLCI look-up table;
- second encapsulation element to sequentially encapsulate said encapsulated IP/UDP frame in a MAC layer;
- transfer element to send said sequentially encapsulated frame to an uplink;
- router to route said sequentially encapsulated frame;
- conversion element to change the destination MAC to the MAC of a GSR and source MAC to an external MAC of said uplink to create a final frame format, and
- an output element sending the final frame out through said uplink port.

12. A system implementing, in a computer environment, FR over IP (FRoIP), as per claim 11, wherein said system is implemented locally or remotely on one or more computer-based systems across networks or existing communication mediums.

13. A system implementing, in a computer environment, FR over IP (FRoIP) as per claim 11, wherein said system is implemented across networks comprising any of LANs, WANs, cellular, Internet or Web based networks.

14. A system implementing, in a computer environment, FR over IP (FRoIP) comprising:
- an IP network comprising one or more IP traffic frames;
- router for routing said IP traffic frames;
- conversion element for changing a destination MAC to the MAC of a DLCI and a source MAC to the internal address of an uplink;
- transfer element to send the converted frame to an I/O card;
- said destination MAC including a bundle number and DLCI number;
- a DLCI look-up table, said DCLI look-up table including at least a DLCI number index and correlating mode determination, said determination mode including any of: IP over FR, FR over IP (FRoIP) or not used;
- termination element for selected DLCI's not used, said termination element deleting the IP traffic frame and ending;
- a first decapsulation element removing the MAC layer from the IP traffic frame;
- said DLCI look-up table further including a destination IP address and UDP port;
- comparator for comparing said destination IP and UDP port with the IP/UDP of the source of said first decapsulation frame; if they are not equal, the frame is deleted, else, the sequence number of an RTP is checked;
- a second decapsulation element sequentially removing the IP/UDP RTP to create a final frame, and
- transfer element sending said final frame through said bundle number.

15. A system implementing, in a computer environment, FR over IP (FRoIP), as per claim 14, wherein said system is implemented locally or remotely on one or more computer-based systems.

16. A system implementing, in a computer environment, FR over IP (FRoIP) as per claim 14, wherein said system is implemented across networks comprising any of LANs, WANs, cellular, Internet or Web based networks.

17. A method of implementing FR over IP (FRoIP) comprising the following steps for up and down link flow:
  1. said down link flow of FR frames from I/O ports comprising the steps:
     (1) receiving the HDLC frame of a first bundle number;
     (2) finding, by a bundle look-up table, a pointer to a DLCI table of said first bundle number;
     (3) calculating a DLCI from a HDLC header;
     (4) determining, by a DCLI look-up table, if this DLCI configures to IP over FR, FR over IP (FRoIP) or is not used;
     (5) if this DLCI mode is not used, deleting the frame and ending;
     (6) if the mode is FR over IP (FRoIP), continuing to step 7;
     (7) finding, by said DCLI look-up table, the destination IP and UDP port, the source IP/UDP port and MAC source;
     (8) changing the FR header, if needed, with optional FR-SSCS;
     (9) encapsulating the frame in IP UDP as selected from said DLCI look-up table;
     (10) encapsulating the frame in a MAC layer;
     (11) sending the frame to the uplink;
     (12) routing the frame;
     (13) changing the destination MAC to the MAC of the GSR and source MAC to the external MAC of the uplink, and
     (14) sending the frame out through the uplink port;
  2. said in flow from the uplink port comprising the steps:
     (1) receiving frame from the uplink port;
     (2) routing the frame;
     (3) changing the destination MAC to the MAC of DLCI and source MAC to the internal address of the uplink;
     (4) sending the frame to the I/O card;
     (5) finding a second bundle number and the DLCI number from the MAC;
     (6) finding, by DLCI look-up table, a pointer to the DLCI table of the second bundle;
     (7) finding by said DLCI look-up table if this DLCI configures FR over IP (FRoIP);
     (8) if this DLCI is not used, deleting the frame and ending;
     (9) removing the MAC layer from the frame.
     (10) if the mode is FR over IP (FRoIP), continuing to step 11;
     (11) finding by DLCI look up table the destination IP and UDP port;
     (12) comparing them with the IP/UDP of the source of that frame;
     (13) if they are not equal deleting the frame and ending;

(14) if they are equal, checking the sequence number of the RTP and reorder frame if needed;
(15) removing the IP/UDP RTP, and
(16) sending the frame through the second bundle number.

18. A method of implementing FR over IP (FRoIP), as per claim 17, wherein said method is implemented locally or remotely on one or more computer-based systems.

19. A method of implementing FR over IP (FRoIP), as per claim 17, wherein said method is implemented across networks comprising any of LANs, WANs, cellular, Internet or Web based networks.

20. A method of implementing FR over IP (FRoIP) comprising:

capturing an HDLC frame with indication of a logical port of a corresponding HDLC bundle;

determining if a DLCI of the frame is configured;

if, no, deleting the frame, else, determining, based on a bundle match table, if the DLCI is configured as an FR over IP (FRoIP);

if configured as an FR over IP (FRoIP), determining, based on a DLCI look-up table, a MAC address and IP/UDP port;

translating and encapsulating between FR core and UDP/IP sub-layers;

encapsulating in a Ethernet physical sub-layer;

routing, and changing MAC, ARP table, to an uplink port, I/O card or specific bundle.

* * * * *